(12) United States Patent
Lawrance et al.

(10) Patent No.: US 8,370,809 B2
(45) Date of Patent: Feb. 5, 2013

(54) SYSTEM, METHOD AND COMPUTER PROGRAM PRODUCT FOR AUTOMATED TEST CASE GENERATION AND SCHEDULING

(75) Inventors: Steven Lawrance, San Francisco, CA (US); Marcus Ericsson, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 138 days.

(21) Appl. No.: 13/052,010

(22) Filed: Mar. 18, 2011

(65) Prior Publication Data

US 2011/0231708 A1 Sep. 22, 2011

Related U.S. Application Data

(60) Provisional application No. 61/319,789, filed on Mar. 31, 2010, provisional application No. 61/315,311, filed on Mar. 18, 2010.

(51) Int. Cl.
*G06F 9/44* (2006.01)

(52) U.S. Cl. ........................................... 717/124

(58) Field of Classification Search .................. 717/124, 717/125
See application file for complete search history.

(56) References Cited

U.S. PATENT DOCUMENTS

| | | |
|---|---|---|
| 7,209,929 B2 | 4/2007 | Dominguez, Jr. et al. |
| 2003/0233404 A1 | 12/2003 | Hopkins |
| 2005/0065925 A1 | 3/2005 | Weissman et al. |
| 2005/0223022 A1 | 10/2005 | Weissman et al. |
| 2005/0283478 A1 | 12/2005 | Choi et al. |
| 2006/0206834 A1 | 9/2006 | Fisher et al. |
| 2008/0126902 A1* | 5/2008 | Hickman et al. ............ 714/741 |
| 2008/0235543 A1* | 9/2008 | Wen et al. .................. 714/724 |
| 2012/0066549 A1* | 3/2012 | Gould et al. ................. 714/37 |
| 2012/0203813 A1* | 8/2012 | Ziv ........................... 708/495 |

OTHER PUBLICATIONS

U.S. Appl. No. 60/828,192, filed Oct. 4, 2006.

* cited by examiner

*Primary Examiner* — Anna Deng
(74) *Attorney, Agent, or Firm* — Zilka-Kotab, PC

(57) ABSTRACT

In accordance with embodiments, there are provided mechanisms and methods for automated test case generation and scheduling. These mechanisms and methods for automated test case generation and scheduling can provide an automated manner of generating test cases and scheduling tests associated with such test cases. The ability to provide this automation can improve efficiency in a testing environment.

9 Claims, 8 Drawing Sheets

SYSTEM, METHOD AND COMPUTER PROGRAM PRODUCT FOR AUTOMATED TEST CASE GENERATION AND SCHEDULING

CLAIM OF PRIORITY

This application claims the benefit of U.S. Provisional Patent Application No. 61/319,789 entitled "Method For Scheduling The Parallel Execution Of Test Cases Within The Run Of A Set Of Tests Using Test Case Prerequisite Expressions," by Lawrance et al., filed Mar. 31, 2010, and U.S. Provisional Patent Application No. 61/315,311 entitled "Methods For Generating And Automating A Tunable Collection Of Test Cases Based On Sets Of Input And Output Parameters For A Feature And Per-Parameter Prerequisite Expressions To Express Dependencies," by Steven Lawrance, filed Mar. 18, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to software testing in a computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventionally, software testing has been provided by executing a particular test case (i.e. scenario, such as a scenario within an application, webpage, code, etc.) and validating a result of the execution. Unfortunately, techniques for generating test cases and executing tests in association with such test cases have been limited. For example, test cases are generally written manually based on an individual's determination that there is a scenario which is desired to be tested. When the scenario changes, such as when a new feature is added which affects the scenario, the test case must be manually changed or a new test case written. As another example, test executions are generally run serially to ensure that prerequisites for a test to be run (i.e. where such prerequisites are associated with another test) are completed, for allowing successful execution of the test.

Accordingly, it is desirable to provide techniques enabling the automation of test case generation and scheduling to improve efficiency in a testing environment.

BRIEF SUMMARY

In accordance with embodiments, there are provided mechanisms and methods for automated test case generation and scheduling. These mechanisms and methods for automated test case generation and scheduling can enable embodiments to provide an automated manner of generating test cases and scheduling tests associated with such test cases. The ability of embodiments to provide this automation can improve efficiency in a testing environment.

In an embodiment and by way of example, a method for automated test case generation is provided. In use, a first plurality of mutually exclusive values for at least one input parameter associated with an operation are identified. Additionally, a second plurality of mutually exclusive values for at least one output parameter associated with the operation is identified. Further, one of the first plurality of mutually exclusive values for each of the at least one input parameter and one of the second plurality of mutually exclusive values for the output parameter are selected. Still yet, a test case is automatically generated for the operation utilizing the selected one of the first plurality of mutually exclusive values and the selected one of the second plurality of mutually exclusive values.

In another embodiment and by way of example, a method for automated test case scheduling is provided. In use, a test is identified. Additionally, it is determined whether the test has at least one prerequisite, utilizing an expression associated with the test. Further, execution of the test is scheduled based on the determination.

While one or more implementations and techniques are described with reference to an embodiment in which automated test case generation and scheduling is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for automated test case generation and scheduling.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing automated test case generation and scheduling will be described with reference to example embodiments.

Figure 1:
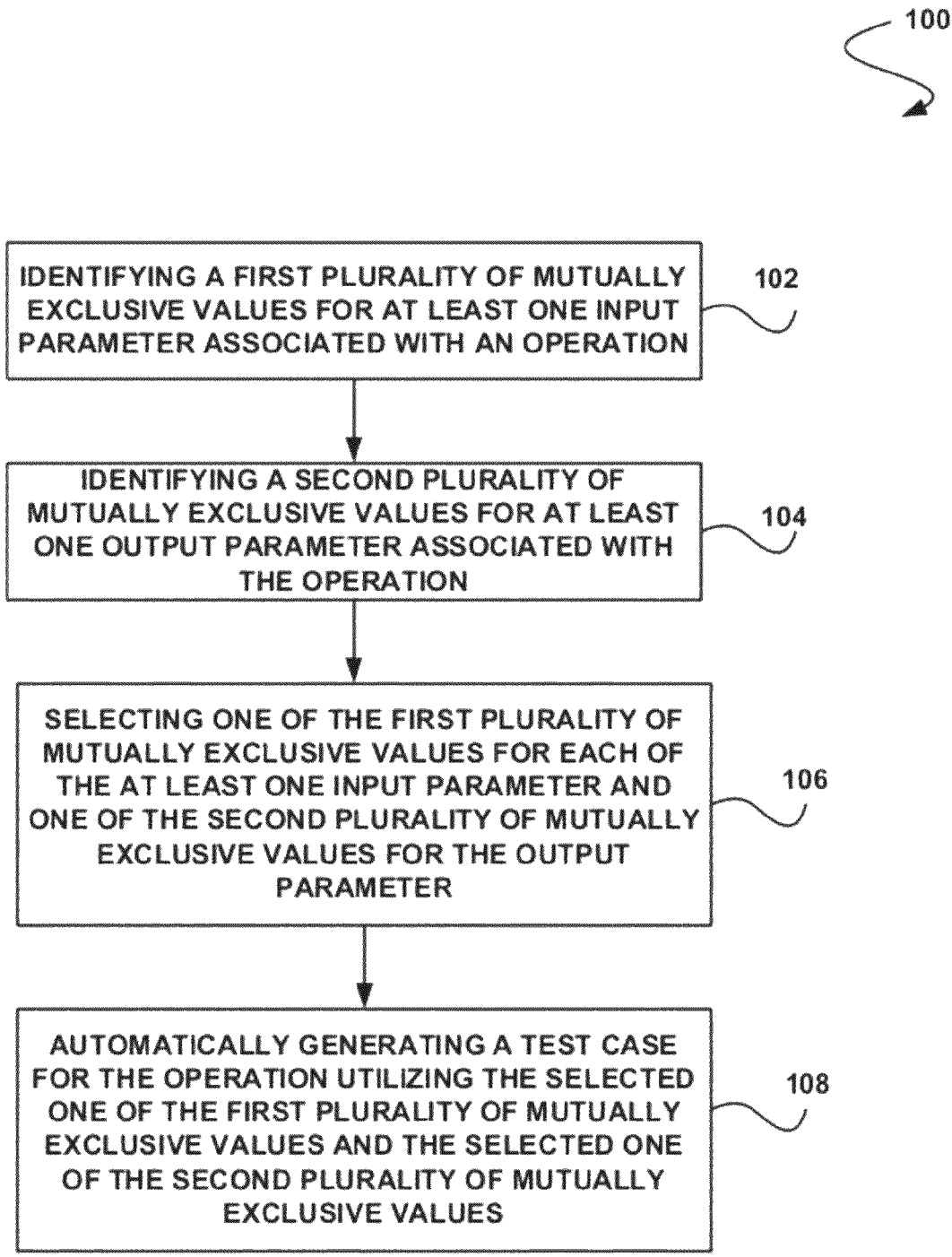
FIG. 1 illustrates a method for automatically generating a test case, in accordance with an embodiment.

FIG. 1 illustrates a method 100 for automatically generating a test case, in accordance with an embodiment. As shown in operation 102, a first plurality of mutually exclusive values for at least one input parameter associated with an operation are identified. In the context of the present description, the operation includes any function or set of functions capable of being executed by a processor of a computer.

In one embodiment, the operation may include a function (e.g. method, etc.) or other feature of an application. For example, the operation may include reading, writing, modifying, analyzing, etc. data stored in memory. Thus, the operation may include internal functionality of the application (e.g. which is not necessarily visible to a user).

In another embodiment, the operation may include a function of a graphical user interface (GUI). For example, the operation may include logging a user into an application (e.g. webpage, etc.) associated with the GUI. As another example, the operation may include functionality associated with a field of the GUI.

To this end, the input parameter may include an input to the operation. For example, the operation may utilize the input to generate output. As noted above, there is at least one input parameter associated with the operation. Thus, a single or multiple input parameters may be associated with (e.g. utilized by) the operation.

Furthermore, the first plurality of mutually exclusive values for the input parameter may include any two or more values capable of making up the input parameter, hut which are also mutually exclusive. For example, the values may include a number, text, code, etc. In this way, each input parameter may be only one of a plurality of values.

In one embodiment, the first plurality of mutually exclusive values may be identified by first determining all possible input values to the operation. Second, the possible input values may be grouped in mutually exclusive sets, where each set is associated with a category (i.e. the input parameter). Just by way of example, where the operation is a login operation, a first input parameter may include a username with the values "known username" and "unknown username," and a second input parameter may include a password with the values "correct password" and "incorrect password."

Additionally, as shown in operation 104, a second plurality of mutually exclusive values for at least one output parameter associated with the operation is identified. In the context of the present description, the output parameter may include any output of (e.g. output generated by) the operation. For example, the output parameter may include as a result of the operation.

In one embodiment, the operation may utilize one of the first plurality of mutually exclusive values of the input parameter to generate the output parameter. As noted above, there is at least one output parameter associated with the operation. Thus, a single or multiple output parameters may be associated with (e.g. generated by) the operation.

Furthermore, the second plurality of mutually exclusive values for the output parameter may include any values capable of making up the output parameter, but which are also mutually exclusive. For example, the values may include a number, text, code, etc. In this way, each output parameter may be only one of a plurality of values.

In one embodiment, the second plurality of mutually exclusive values may be identified by first determining all possible output values to the operation. Second, the possible output values may be grouped in mutually exclusive pairs, where each pair is associated with a category (i.e. the output parameter). Just by way of example, where the operation is a login operation, the output parameter may include a login result with the values "success" and "failure."

Further, as shown in operation 106, one of the first plurality of mutually exclusive values for each of the at least one input parameter and one of the second plurality of mutually exclusive values for the output parameter are selected. Thus, for each input parameter of the operation, a single value may be selected from the mutually exclusive values associated therewith, and further for the output parameter of the operation, a single value may be selected from one of the mutually exclusive values associated therewith. It should be noted that the one of the first plurality of mutually exclusive values for each of the at least one input parameter and the one of the second plurality of mutually exclusive values for the output parameter may be selected in any desired manner.

In one embodiment, the selection may include first selecting the one of the second plurality of mutually exclusive values and second selecting one of the first plurality of mutually exclusive values that is predetermined to be valid with respect to the selected one of the second plurality of mutually exclusive values. For example, the one of the mutually exclusive values associated with the each input parameter may be selected based on which of the mutually exclusive values associated with the output parameter is selected. Namely, the one of the mutually exclusive values associated with each input parameter may be selected in response to a determination that such value is valid with respect to the selected one of the mutually exclusive values associated with the output parameter.

Just by way of example, where the operation is the aforementioned login operation, the selected value for the username parameter may be "known username" and the selected value for the password parameter may be "correct password." In such scenario, the only valid value for the login result parameter may be "success" since it may be predetermined that "failure" is not valid for the selected "known username" and "correct password" input parameter values, or alternatively it may be predetermined that only "success" is valid with respect to the selected "known username" and "correct password" input parameter values.

The predetermination of validity may be provided using expressions (e.g. rules). In one embodiment, an expression associated with the selected one of the second plurality of mutually exclusive values may indicate which of the first plurality of mutually exclusive values is valid with respect to the selected one of the second plurality of mutually exclusive values. For example, each expression may indicate a different valid scenario for the operation. As an option, the expression may be stored in a data repository.

Still yet, as shown in operation 108, a test case is automatically generated for the operation utilizing the selected one of the first plurality of mutually exclusive values and the selected one of the second plurality of mutually exclusive values. The test case may include any code, file, etc. capable of being utilized in association with testing of the operation. In one embodiment, the test case may store the selected one of the first plurality of mutually exclusive values and the selected one of the second plurality of mutually exclusive values, in association with an identifier of the operation.

In another embodiment, the test case may be utilized for testing the operation. For example, an application may execute the operation using the input parameter values indicated by (e.g. stored in) the test case. The application may further confirm validity of a result of the execution of the operation by comparing the result with the output parameter value indicated by the test case. For example, if the result matches the output parameter value, then it may be determined that the operation executes correctly (i.e. passes the test), whereas if the result does not match the output parameter, then it may be determined that the operation executed incorrectly (i.e. does not pass the test).

By automatically identifying combinations of input parameter values and output parameter values and using the same to generate test cases for an associated operation, test cases may be generated in an automated manner (e.g. without necessarily requiring manual input). Moreover, by only determining valid combinations of input parameter values and output parameter values, it may be ensured that the generated test cases are for valid scenarios associated with the operation.

Figure 2:
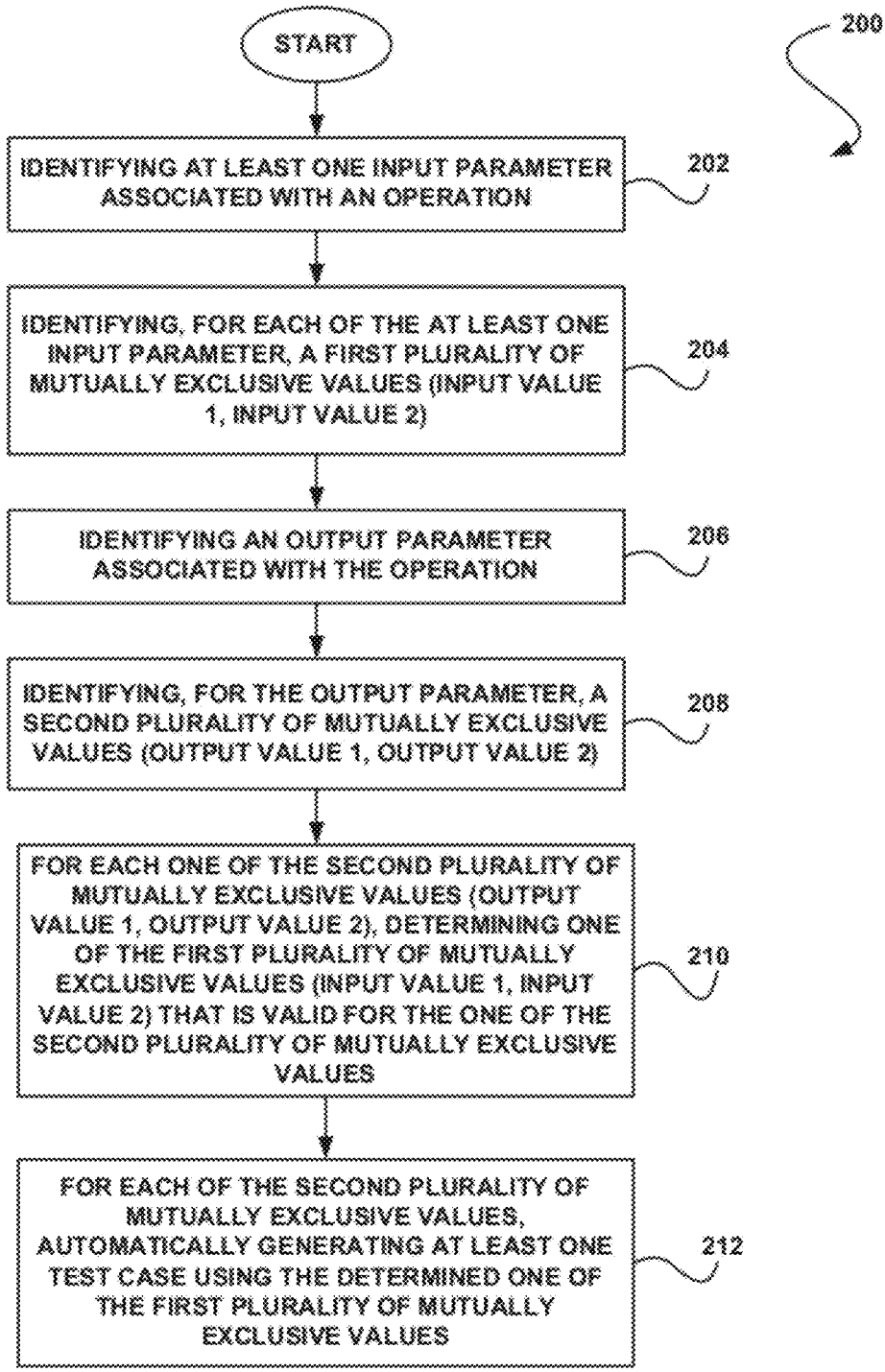
FIG. 2 illustrates a method for automatically generating a valid test case, in accordance with an embodiment.

FIG. 2 illustrates a method 200 for automatically generating a valid test case, in accordance with an embodiment. As an option, the present method 200 may be carried out in the context of the functionality of FIG. 1. Of course, however, the method 200 may be carried out in any desired environment. The aforementioned definitions may apply during the present description.

As shown in operation 202, at least one input parameter associated with an operation is identified. The operation for which the input parameter(s) is determined may include any operation of which testing is desired. For example, the operation may include a function in code that is desired to be tested (i.e. for confirming that the operation executes as intended). As an option, the operation may include an interface with a single method to perform a feature's operation for a given set of selected input parameter values.

Each input parameter may include a different type of input utilized by the operation for execution. For example, each input parameter may include a different category of input to the operation which is capable of being one of only a plurality of values. To this end, each input parameter may be one of a plurality of input values, as described below. As an option, a parameter may be an interface with a method to get a current runtime value and another method to set the current runtime value.

Additionally, for each of the identified input parameters (i.e. input parameters 1 through N), a first plurality of mutually exclusive values are identified (hereinafter "input value 1, input value 2"). Note operation 204. The first plurality of mutually exclusive values may include values that are capable of making up the input parameter. Further, since the values are mutually exclusive, the input parameter may only be capable of being one of the values.

As shown in operation 206, an output parameter associated with the operation is identified. The output parameter may include a type (e.g. category) of output from the operation. In one embodiment, the output parameter may be capable of being only one of a plurality of values, as described below.

Still yet, a second plurality of mutually exclusive values (hereinafter "output value output value 2") are identified for the output parameter. Note operation 208. The second plurality of mutually exclusive values may include values that are capable of making up the output parameter. Further, since the values are mutually exclusive, the output parameter may only be capable of being one of the values.

For each one of the second plurality of mutually exclusive values, the one of the first plurality of mutually exclusive values that is valid for such one of the second plurality of mutually exclusive values is determined. Note operation 210. For example, for "output value 1" it may be determined whether "input value 1" and/or "input value 2" are valid, and for "output value 2" it may be determined whether "input value 1" and/or "input value 2" are valid. Such validity may be determined using an expression associated with each of the second plurality of mutually exclusive values. It should be noted that where multiple input parameters are identified, an input value for each of such input parameters may be determined for resulting in each combination of input values that are valid with respect to each particular one of the output values.

To this end, the outputs may be deterministically driven by the inputs (as determined using predetermined expressions, etc.). Furthermore, the inputs may also be deterministically driven by other inputs (e.g. as determined using the predetermined expressions, etc.). Particularly, a combination of values, each for a different input parameter, may not necessarily only depend on the output parameter value, but may also depend on the other input parameter values (e.g. where input parameter values may also have validity determined based on other input parameter values selected for the output parameter value).

Moreover, as shown in operation 212, for each of the second plurality of mutually exclusive values, at least one test case is automatically generated using the determined one of the first plurality of mutually exclusive values. For example, for each valid combination of input parameter values for each output parameter value may be used to generate a separate test case. In the example above, where for "output value 1" it is determined that "input value 1" and "input value 2" are valid, and for "output value 2" it is determined that "input value 1" is valid, the generated test cases may include those shown in Table 1. Of course, it should be noted that the test cases are illustrative only, and thus should not be construed as limiting in any manner.

TABLE 1

Test Case 1: input value 1, output value 1
Test Case 2: input value 2, output value 1
Test Case 3: input value 1, output value 2

As shown, each test case may store the valid combination of input parameter values/output parameter values. Each test case may then be used to test the operation with respect to the scenario indicated by the combination of input parameter values/output parameter values stored therein. With respect to the example shown in Table 1, Test Case 1 may be used to test the operation by executing the operation using input value 1 and validating an output of the operation using output value 1. If the output of the operation does not match the output value 1, then detailed information about the difference between the output and output value 1 may be provided (e.g. to a user, etc.). The detailed information may also include the input parameter values used and the expression associated with the output parameter value, as an option, for use by a user in identifying a cause of the invalid output of the operation. If the output of the operation matches the output value 1, then information indicating that the operation passed the test associated with the test case may be provided (e.g. to the user, etc.).

As a further option, test coverage of the test cases may also be measured. For example, call interception may be used to be notified whenever an operation of interest is being called by a test which is not necessarily the basis of one of the automatically generated test cases (e.g. which is the basis of a manually generated test case). If the input/output parameters and their input/output parameter values are constructed in a manner that can determine their expressions from a query string parse, then the current runtime input parameter values for those input parameters can be determined via the method described above with respect to FIG. 2, and the output parameters can determine their selected output parameter values based on their examinations of the query results. With the input and output parameter values known, the test case including those values may be marked as tested, and optionally the test cases that are being performed redundantly and by which tests. This can help with test cleanups to improve performance by reducing testing redundancy.

When code of an operation is modified, a user (e.g. associated with the modification) may run all tests cases once or periodically to ensure that no test case is left untested. Testing the full set of test cases may be infeasible due to the quantity, so optionally only a subset of the test cases may be tested. The specific test cases tested may be stored in set of database tables, which may be populated and managed from several sources. This database may also be used by the super-extended run to know which test cases to not execute. To minimize storage space requirements, only those scenarios that are not executed by the super-extended run may be stored in the database.

As described above, the parameters along with their values and associated expressions may act as the main source in determining test cases for an operation. Part of that test case generation process may create a test case subset that attempts to test as many valid combinations of input/output parameter values as possible with a fewest number of test cases by selecting a diagonal cross section of the valid combinations of input/output parameter values. Valid combinations of input/output parameter values that are already being tested by a generated test case may be given a lower priority over other valid combinations of input/output parameter values for each subsequently generated test case. Possible exit conditions for the test case subset generation may include generating a configured maximum number of test cases, testing every valid combination of input/output parameter values at least once, or exhausting all possible test cases.

A user interface may allow users to manually add or remove scenarios from the database. The database may keep track of the source of the test cases, which may make it easier to differentiate the different sources from each other. This user interface may also be used to convert an automatically added test case into a manually added test case, so that it can be removed from the database only by the user.

Scenarios that are tested by existing tests (e.g. not necessarily automatically generated in the manner described above) can be noted in the database by a user manually marking a test case as being already tested. This may helps avoid testing a test case at random that is already covered by an existing test.

For further automation, a configured number of random untested test cases may be executed in a regular test run. If such a randomly executed test case fails, then the test case may be noted with an indication of its failure occurrence in the database. This may give regression protection in the case that the test case fails again in the future.

Because it is possible for a test run to be bad as a result of environment and other factors, a "bad run" page can be used to mark a test run as bad. When that happens, the test cases that were added from a randomized test failure may be deleted if the test run that a user declared as had was the only test run that had the failed scenario. This may help protect against adding too many tests to the database. Similarly, as an old test run expires, automatically-added test cases that were added from that test run's random testing may be automatically deleted if no other existing test runs noticed failures on those test cases, excepting any that the user promoted from being automatically added to being manually added.

When a set of valid test cases are generated, an acyclic directed graph of input/output parameter values linked by their expressions may be built. The terminal nodes on this graph may be the output parameter values. Starting with the terminal nodes in the graph, a set of summarized test cases may be created, which it calls "candidates," starting with the assumption that all test cases are possible. A candidate may store one or more selected input parameter values with each input parameter whereas a test case may store exactly one selected input parameter value with each input parameter. Within a candidate, every combination of input parameter values may be valid scenarios (e.g. without consideration of the associated expression). This optimization may help save memory and processing time during the test case generation process in addition to generating a convenient grouping of test cases that test case subsets can be drawn from. Thus, the first test case created may select all input parameter values in each parameter before descending into the terminal nodes.

When each node in the graph is processed, starting from the terminal nodes and working backwards in the graph, the input set of candidates is reduced to select only the current node's valid combination of input parameter values. The node then descends into its prerequisites, which might be a conjunction, disjunction, negation, nesting of any of the aforementioned, or simple reference to other input parameter values. As those nodes return, their candidates are merged in a manner that may be appropriate for the expression. Candidates that differ only in one parameter may be disjuncted together as an optimization. As a low-level detail, hash codes on the internal sets may be memorized to significantly improve the performance of this process. The node may then return that set of candidates to the node that called the current node. At the end of the processing, a set of candidates may exist that summarizes the set of valid test cases without having to store each test case individually in memory. With the set of candidates built, a representative subset of test cases may be built and saved to the database for regression testing in autobuild. The manner in which the subset is selected is described above.

With the above method 200 for automatically generating test cases, other processes/functionality may be automated. Examples of such processes are described in Table 2, which are set forth by way of example only.

TABLE 2

Computing the size of a feature's testing space
    By focusing on how parameters' values relate to each other, the work of computing a set of valid test cases may be automated
    Comparing the number of test cases covered by automated tests with the total number of feasible test cases can help paint a true picture of the test coverage.
Adding new parameters to an operation incrementally
    New parameters added to an operation may be identified automatically
Documenting and communicating how an operation's parameters interact with each other
    By being a major part of the operation's test definition, the collection of parameters, parameter values, and expressions may be kept up to date as features incrementally evolve over time
Reusing existing parameters in other operation's tests
    Parameter implementations focus on getting and, if not an output parameter, setting their current runtime values. Parameters that affect account-wide states can be shared easily, and parameters that affect record field states might be sharable, depending on how they are constructed, Test owners thus may not need to build significant test functionality from scratch and/or hit a significant learning curve when automating combinatorial tests with features unknown to them
Determining an operation's existing test case or scenario coverage
    For operations and features that lend themselves to test operation injection, such as application program interface calls, how well the scenario coverage in a feature is as well as which tests test each scenario may be measured
Naming test scenarios
    Test names may be created based upon valid combination in of input/output parameter values
Logging test scenarios
    Documentation may be automated, such as the valid combinations of input parameter values and, for the expected results, the output parameter value(s)

Figure 3:
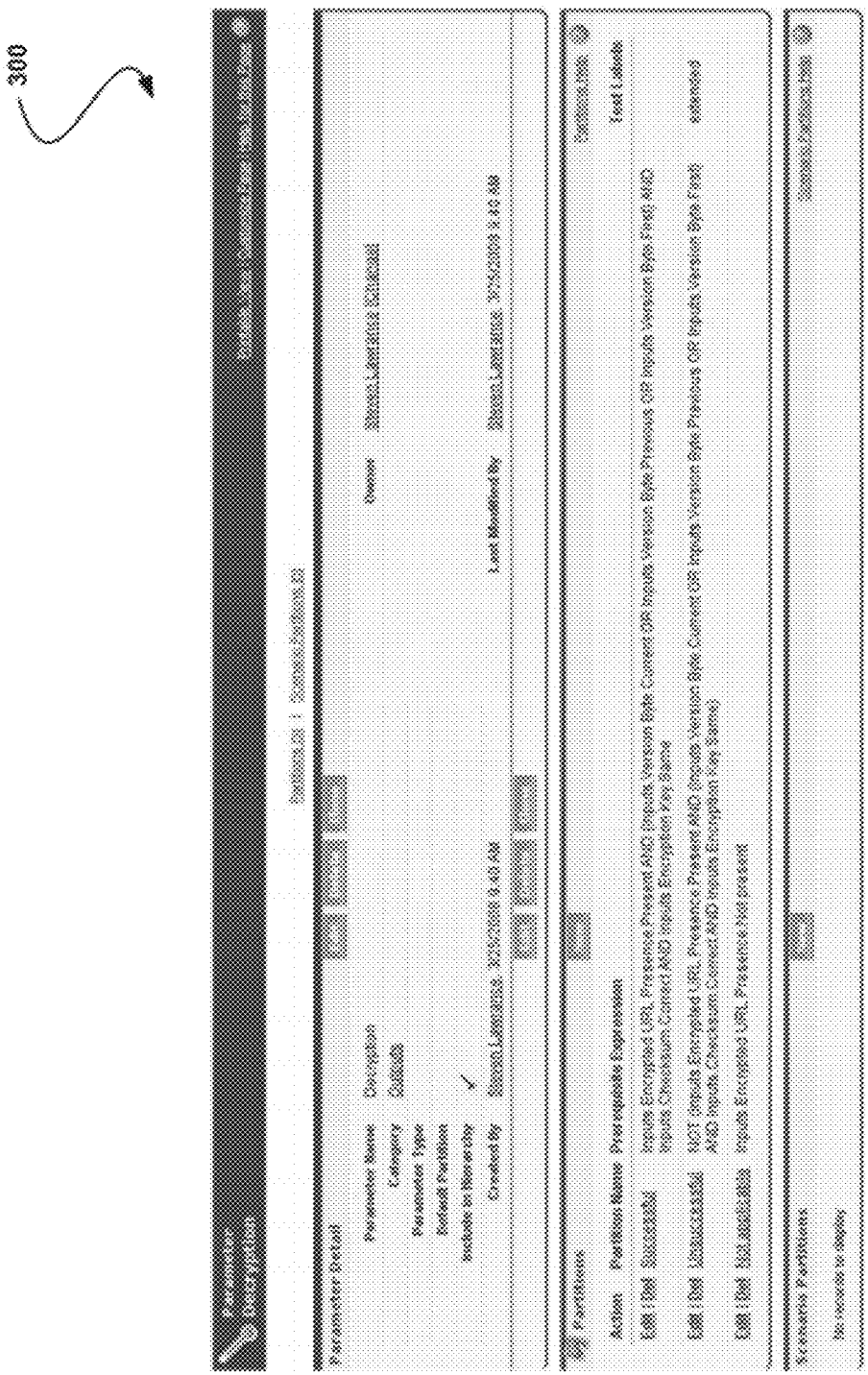
FIG. 3 illustrates a graphical user interface (GUI) for configuring an expression associated with an operation, in accordance with an embodiment.

FIG. 3 illustrates a graphical user interface (GUI) 300 for configuring an expression associated with an operation, in accordance with an embodiment. As an option, the present GUI 300 may be implemented in the context of the functionality of FIGS. 1-2. Of course, however, the GUI 300 may be implemented in any desired environment. Again, the aforementioned definitions may apply during the present description.

In the present embodiment, the expression may indicate for each output parameter value for an operation (e.g. "Decryption" as shown), the valid input parameter values associated therewith. In the embodiment shown, the "Partition Name" is the output parameter value (e.g. "successful," "unsuccessful," etc.), and the "Prerequisite Expression" is the expression indicating the valid input parameter values associated with the output parameter value.

As an option, expressions can optionally state from which input parameter value for the same output parameter value a state transition to it is possible as well as a relative state change cost for that state transition. This cost information may be used to automatically optimize when the input parameter values are changed during a test run. For example, parameters that incur high state change costs may be changed in the test run's outermost loops whereas parameters with no or minimal state change costs may be changed in the test run's innermost loops.

As another option, the expressions may be associated with documentation. For example, when a user needs to know an expected output parameter value for input value parameters included in a particular test case, that user can look up that test case by the input parameter values and see the expected output parameter value. By looking at the expressions starting from the output parameter values, that user can also get a better sense of why that expected output parameter value was chosen. Users may also view which test cases are affected by changes to the expressions, which may mirror code changes. Those expressions may highlight the dependencies that exist between the input/output parameters.

During a test run (e.g. execution of a plurality of test cases), input parameters that depend on other input parameters/output parameters through one or more direct or indirect expressions may have their current runtime input parameter value set with each subsequent test case execution, even if those input parameter values' selected input parameter values equal those in the preceding test case. This may help notify input parameters when one or more upstream dependencies change the testing state in a dramatic manner, such as switching an account the test is logged into or the record that the feature is testing. Input parameters that don't depend upon each other may be independent and are more flexible when reusing them in another feature's test cases.

Figure 4:
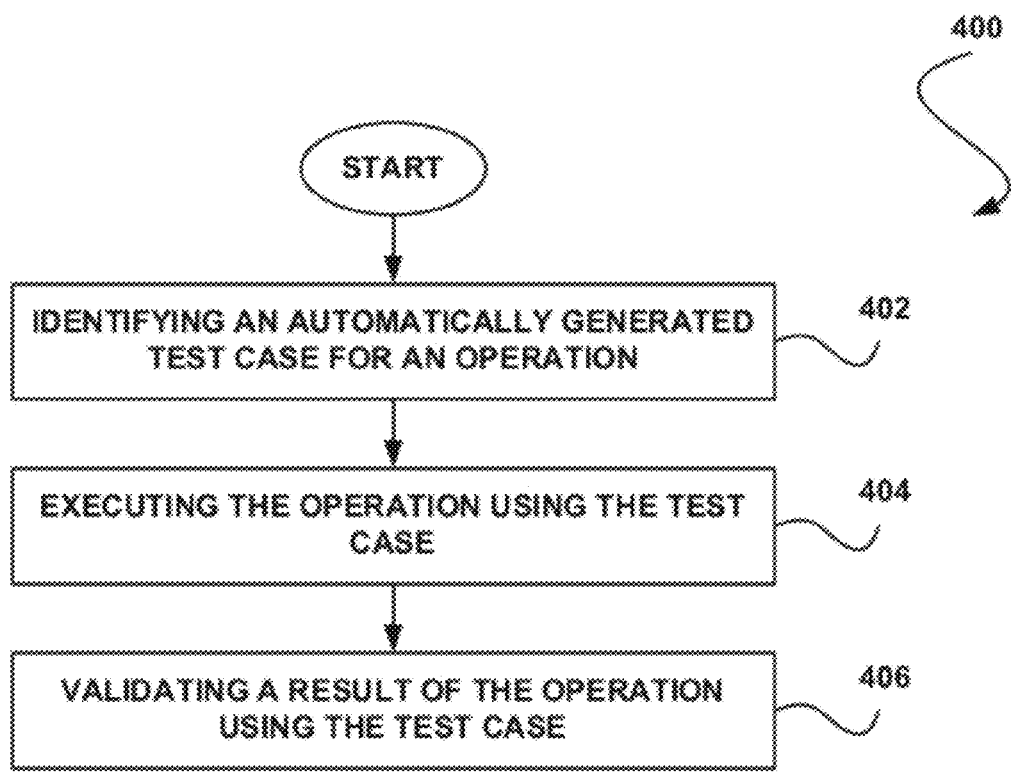
FIG. 4 illustrates a method for testing utilizing an automatically generated test case, in accordance with an embodiment.

FIG. 4 illustrates a method 400 for testing utilizing an automatically generated test case, in accordance with an embodiment. As an option, the present method 400 may be carried out in the context of the functionality of FIGS. 1-3. Of course, however, the method 400 may be carried out in any desired environment. Again, the aforementioned definitions may apply during the present description.

As shown in operation 402, an automatically generated test case for an operation is identified. The test case may include the test case generated in the manner described above with respect to FIGS. 1 and/or 2. In one embodiment, the test case may be identified in response to a periodic identification of all test cases to be executed. In another embodiment, the test case may be identified by virtue of its inclusion in a database of test cases.

Additionally, the operation is executed using the test case, as shown in operation 404. In one embodiment, the operation may be executed using the input parameter values stored by the test case. For example, the input parameter values may be used as input to the operation.

Further, in the present embodiment, the operation may be executed for determining a result of the operation. In particular, the result may include an output of the operation. Just by way of example, the result may include a value.

Moreover, the result of the operation is validated using the test case. Note operation 406. The test case may store an expected output of the operation in the form of an output parameter value. For example, the expected output may be specific to the input parameter values stored by the test case (e.g. may only be expected when the input parameter values stored by the test case are input to the operation).

Validating the result of the operation may include comparing the result to the output parameter value stored by the test case. If the result of the operation matches the output parameter value, then the result of the operation may be determined to be valid. If, however, the result of the operation does not match the output parameter value, then the result of the operation may be determined to be invalid.

As an option, a result of the validation (e.g. indicating whether the result of the operation is valid/invalid) may be stored. For example, the result of the validation may be stored in the database in association with the test case. To this end, a user or other application may identify the result of the validation for use in determining whether the operation executes as expected or whether modifications to the operation are necessary to allow the operation to executed as expected.

Figure 5:
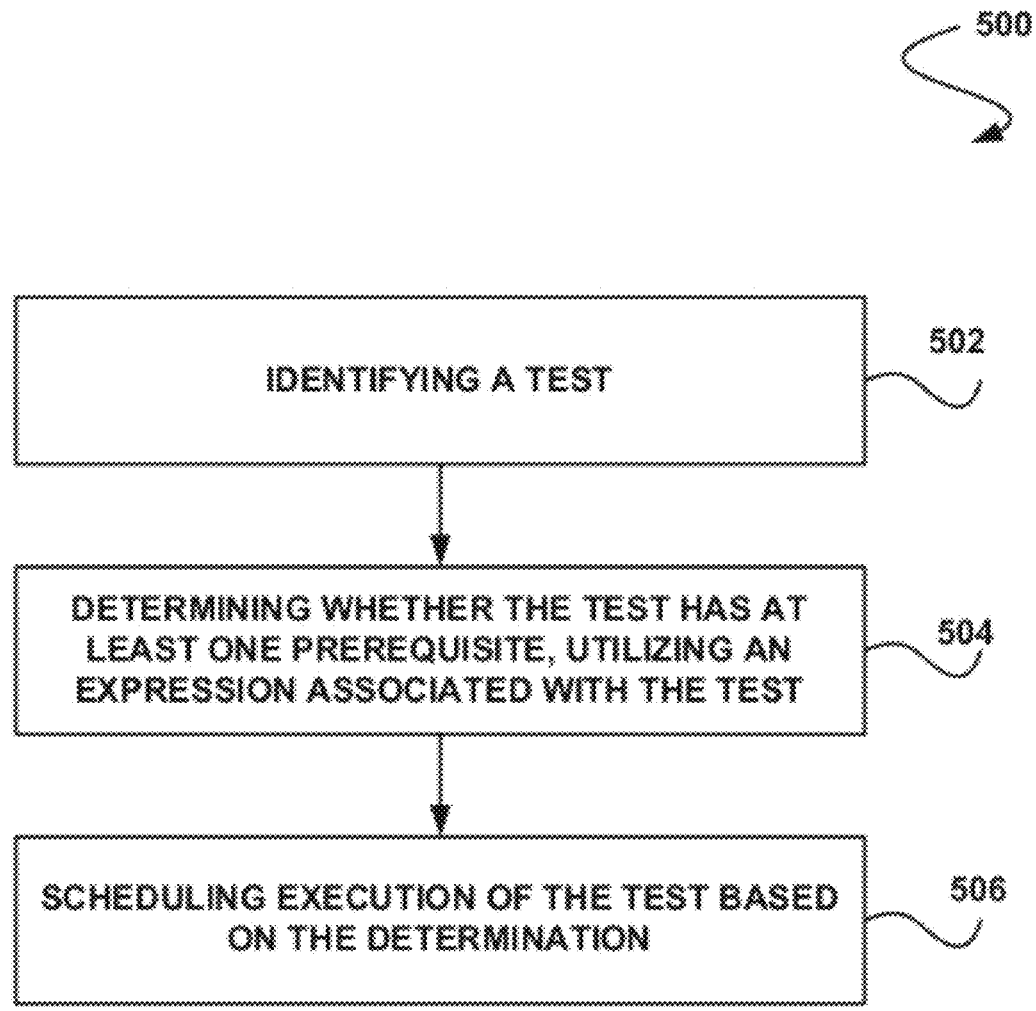
FIG. 5 illustrates a method for automatically scheduling a test, in accordance with an embodiment.

FIG. 5 illustrates a method 500 for automatically scheduling a test, in accordance with an embodiment. As an option, the present method 500 may be carried out in the context of the functionality of FIGS. 1-4. Of course, however, the method 500 may be carried out in any desired environment. Again, the aforementioned definitions may apply during the present description.

As shown in operation 502, a test is identified. In one embodiment, the test may include an automatically generated test case (e.g. as described above with respect to FIGS. 1-4. In another embodiment, the test may include a manually generated test case. Of course, however, the test may include any code, data, etc. capable of being used for testing an operation.

To this end, the test may optionally include input parameter values that are configured in a test case in addition to an operation associated with the input parameter values. For example, the test may include the input parameter values to be used as input to the operation. As another option, the test may include the input parameter values configured for the operation and an indication of the operation associated with the input parameter values. As yet another option, the test may include at least one output parameter value configured for the operation (e.g. for use in validating an output of the operation).

Additionally, as shown in operation 504, it is determined whether the test has at least one prerequisite, utilizing an expression associated with the test. In the context of the present embodiment, the expression may include any data or code associated with the test which is capable of potentially indicating at least one prerequisite to the test. The expression may express the prerequisites using an English-like sentence.

In one embodiment, the expression may be stored in code associated with the test (e.g. in a class from which the test is derived). In another embodiment, the expression may be stored as an annotation directly above a method which executes the test. If a prerequisite expression exists on both the test method and on the test class, it will be treated as if both prerequisite expressions are combined with a conjunction ("and").

To this end, the expression may store the prerequisite. It should be noted that the prerequisite may include any condition (e.g. event) upon which the test is allowed to be executed (e.g. such that the test may not necessarily be allowed to execute prior to the condition being met). For example, the prerequisite may include an operation required to be performed prior to execution of the test, a value required to be determined prior to execution of the test, such as expected test case states, time durations, prerequisite checkers, and/or nestable combinations of the same.

Table 3 illustrates various examples of prerequisites that may be used to form a prerequisite expression for a test. Of course, it should be noted that the prerequisites are set forth for illustrative purposes only, and thus should not be construed as limiting in any manner.

TABLE 3

1) Test
The test named must have either completed or started, depending on the verb used, before this part of the prerequisite will be considered met.
    Form
when [test-name] verb
    test-name: This can be one of the following types of names, The name must be enclosed
    in square brackets, and a square bracket can be a part of the name if it is escaped with a
    backslash
        Relative
            Name of a test method within the same Java class
            Name of a class and test method within the same Java package
            Name of a class and test method within the same test hierarchy
        Absolute
            Fully qualified Java name of a test method
            Starts-with search of the test hierarchy
    verb: This can be positive or negative and handle either final or transient states, Final
    states include passing, failing, or being skipped. Transient states include "starting"
        Does
            passes: The prerequisite is satisfied when all matched tests pass
            fails: The prerequisite is satisfied when all matched tests fail
            completes: The prerequisite is satisfied when all matched tests either pass
            or fail. Note that skipped tests are not included in this set
            starts: The prerequisite is satisfied when all matched tests begin to run
            retries: The prerequisite is satisfied when all matched tests are retried as a
            result of failing on the first try
            is skipped: The prerequisite is satisfied when all matched tests are skipped
            is processed: The prerequisite is satisfied when all matched tests are
            processed, meaning that they have reached a final state
        Does not
            does not fail: The prerequisite is satisfied when all matched tests either
            pass or are skipped
            does not pass: The prerequisite is satisfied when all matched tests either
            fail or are skipped
            does not complete: The prerequisite is satisfied when all matched tests are
            skipped. Note that if the run is stopped prematurely, no further testing is
            permitted in the run, so while processing and unprocessed tests would
            conceptually be satisfied with this verb, the fact that the run won't run any
            more tests means that we don't need to process any more prerequisites once
            the test run gets into that state
            does not retry: The prerequisite is satisfied when all matched tests
            complete without having to be retried. In other words, the tests did not flap.
            This prerequisite is also matched for skipped tests, since they technically
            did not retry TABLE 3-continued does not start: The prerequisite is satisfied when all matched tests skip.
Started tests are excluded from this set
does not skip: The prerequisite is satisfied when all matched tests start.
Skipped tests are excluded from this set 2) Time A specified amount of time must elapse before the prerequisite is met. This time is based off of when the testing begins, but if a time expression is included within a sequence, then the time is based off of when the previous prerequisite in the sequence was met. This expression can be expressed in minutes, seconds, or milliseconds. An upper boundary will be enforced so that tests cannot wait for an unreasonable amount of time (to be determined). The form is a number followed by "minutes", "seconds", "milliseconds", "m", "s", or "ms". Singular forms are also permitted: "minute", "second", and "millisecond". A space between the number and the unit is optional.

Form
wait n time-unit
   n: Any positive integer that is greater than zero
   time-unit:
     minutes, minute, or m: Minutes
     seconds, second, or s: Seconds
     milliseconds, millisecond, or ms: Milliseconds As an option, if the amount of time that a time prerequisite will wait for will delay its execution such that it will push against the desired overall execution time, then the test can be marked as skipped. This can be controlled by a parameter on this prerequisite type. To make this determination, historical test and test suite run times may be used as well as how much time remains in the test run versus the test's expected execution time at the time of its prerequisite evaluation.

3) Generic Prerequisite Checker

Generic prerequisite checkers allow tests to depend on an arbitrary Java-defined prerequisite whose condition can optionally be periodically checked on an interval defined either in the prerequisite expression or in the Java-implemented prerequisite checker. This enables tests to wait for conditions that depend on data or background processes in the application server whose statuses can be queried via the API. The scheduler will query a prerequisite checker for its status. From this check, the prerequisite checker can return one of four values: prerequisite is satisfied, prerequisite is not satisfied, check the prerequisite again after waiting for the period defined in the prerequisite expression that uses this prerequisite, or check the prerequisite again after an arbitrary amount of time set by the prerequisite checker's Java code.

Prerequisite checkers may use a list of arguments that are optionally specified in the prerequisite expression. These arguments are passed in via a string list.

Multiple prerequisite expressions can reference the same prerequisite checker. When that happens and when the starting times of those multiple references equal as well as the optional argument lists, those multiple references are coalesced into one so that the prerequisite checker is queried only once per check attempt for the these multiple references. The most frequent period from those multiple prerequisite checker references is used in the coalesced reference. Note that identical references to the same checker that are invoked with different start times, such as when sequences are used, are not coalesced. This permits an explicit check to occur after another prerequisite is met in a prerequisite expression, such as in the case of "check after when [testA] passes" and "check", which are not coalesced due to their differing start times.

Form
check [checkerClass] ([argument$_1$], [argument$_2$], [argument$_3$], . . . ) every n time-unit
check
   Each part of this prerequisite expression is optional, except for "check"
   The checkerClass is a relative or fully qualified Java class name of a prerequisite checker
   that implements the PrerequisiteChecker interface and has either a null-argument
   constructor or, if it's an instance of TestCase, a one-string-argument constructor, making it
   implementable in test classes. Relative class names are simply unqualified class names that
   belong to the same package of the class containing the prerequisite expression being
   processed
   When the checkerClass and its surrounding square bracket characters are not included in
   the expression, then the class that contains the prerequisite expression being processed is
   used as the prerequisite checker class
   Zero or more arguments can exist, and these arguments are passed as-is and in the order
   listed to the prerequisite checker as a list of strings
   The optional period follows "every" and is used to tell the scheduler how much time to
   wait for after a prerequisite check has determined that it does not yet know if the
   prerequisite is satisfied or not satisfied. If not specified and if the prerequisite checker does
   not set the delay itself and tells the scheduler to check the prerequisite again in the future,
   the prerequisite will fail as a result of the scheduler not knowing how long to wait for
     n: Any positive integer that is greater than zero
     time-unit:
       minutes, minute, or m: Minutes
       seconds, second, or s: Seconds
       milliseconds, millisecond, or ms: Milliseconds
   Using "check" by itself, as implied by the above, tells the scheduler to use the class that
   contains the prerequisite expression being processed as the prerequisite checker with no
   arguments and no prerequisite expression specified checker period Table 4 shows examples of language that may be used within the prerequisite expression to join the prerequisites. Again, it should be noted that the language shown is set forth for illustrative purposes only, and thus should not be construed as limiting in any manner.

TABLE 4

1) Conjunction
For the prerequisite to be met, all child prerequisites must be met. Any time-based prerequisites are based off of the starting time of the conjunction. For sequential time, use the sequence. Two or more child prerequisites can exists, and each one is separated with "and".
    Form
prerequisite$_1$ and prerequisite$_2$
prerequisite$_1$ and prerequisite$_2$ and prerequisite$_3$ . . .
    Two or more prerequisites are specified in a conjunction
2) Disjunction
For the prerequisite to be met, at least one of the child prerequisites must be met. Any time-based prerequisites are based off of the starting time of the conjunction. Two or more child prerequisites can exists, and each one is separated with "or".
    Form
prerequisite$_1$ or prerequisite$_2$
prerequisite$_1$ or prerequisite$_2$ or prerequisite$_3$ . . .
    Two or more prerequisites are specified in a disjunction
3) Sequence
For the prerequisite to be met, all child prerequisites must be met. Child prerequisites are checked in the order that they appear in the sequence, and the starting times of time-based prerequisites are based off of the ending time of their preceding sibling prerequisite. Two forms exist for sequences: "after" and "and, after that,". The first form places the second prerequisite before the "after" keyword and the first prerequisite after the "after" keyword. The second form places the child prerequisites in the order that they will be evaluated in, and the second form allows for more than two child prerequisites to exist.
    Forms
prerequisite$_1$ and, after that, prerequisite$_2$
prerequisite$_1$ and, after that, prerequisite$_2$ and, after that, prerequisite$_3$ . . .
prerequisite$_2$ after prerequisite$_1$
    When "after" is used instead of "and, after that," only two prerequisites are permitted in
    the compound expression. That form is meant as a shorthand for convenience
4) Compound Expression Nesting
It's possible to nest compound expressions with parentheses. In a compound expression, any expression that is not a time or test must be grouped within parentheses.
    Form
(innerExpression)
    The innerExpression can be any prerequisite expression, and the entire expression above
    can be used in place of any prerequisite
    Infinite levels of nesting are permitted Further, as shown in operation 506, execution of the test is scheduled based on the determination. In one embodiment, execution of the test may be scheduled for a beginning of a test run executing a batch of tests, in response to a determination that the test does not have a prerequisite. Thus, a test that does not have any prerequisites which must be met prior to the test being run may be scheduled to be run at a beginning of the batch of tests (e.g. without any further processing being performed to determine whether the test may be executed).

In another embodiment, execution of the test may be scheduled upon completion of the prerequisite, in response to a determination that the test has the prerequisite. For example, an event listener may be instantiated for each prerequisite identified for the test, such that upon all prerequisites being met (as indicated by the event listeners) the test may be scheduled to be executed. As an option, when multiple tests have the same prerequisite, a single event listener may be registered the prerequisite shared across the tests. Thus, scheduling of the test may be determinant on prerequisites of the test.

By scheduling tests based on prerequisites associated therewith being met, the scheduling of tests may optionally be event-driven (i.e. upon events completing the prerequisites). In addition, the use of prerequisites to schedule tests may improve a quality of the execution of tests, by ensuring that any data, etc. used by the test is available. Moreover, when a prerequisite for a test has not been met, such that execution of the test would be unsuccessful (e.g. incapable of being completed, etc.), execution of the test may be avoided by preventing scheduling of the test thus avoiding unnecessary resource (e.g. processor, etc.) usage by the otherwise execution of the test.

Figure 6:
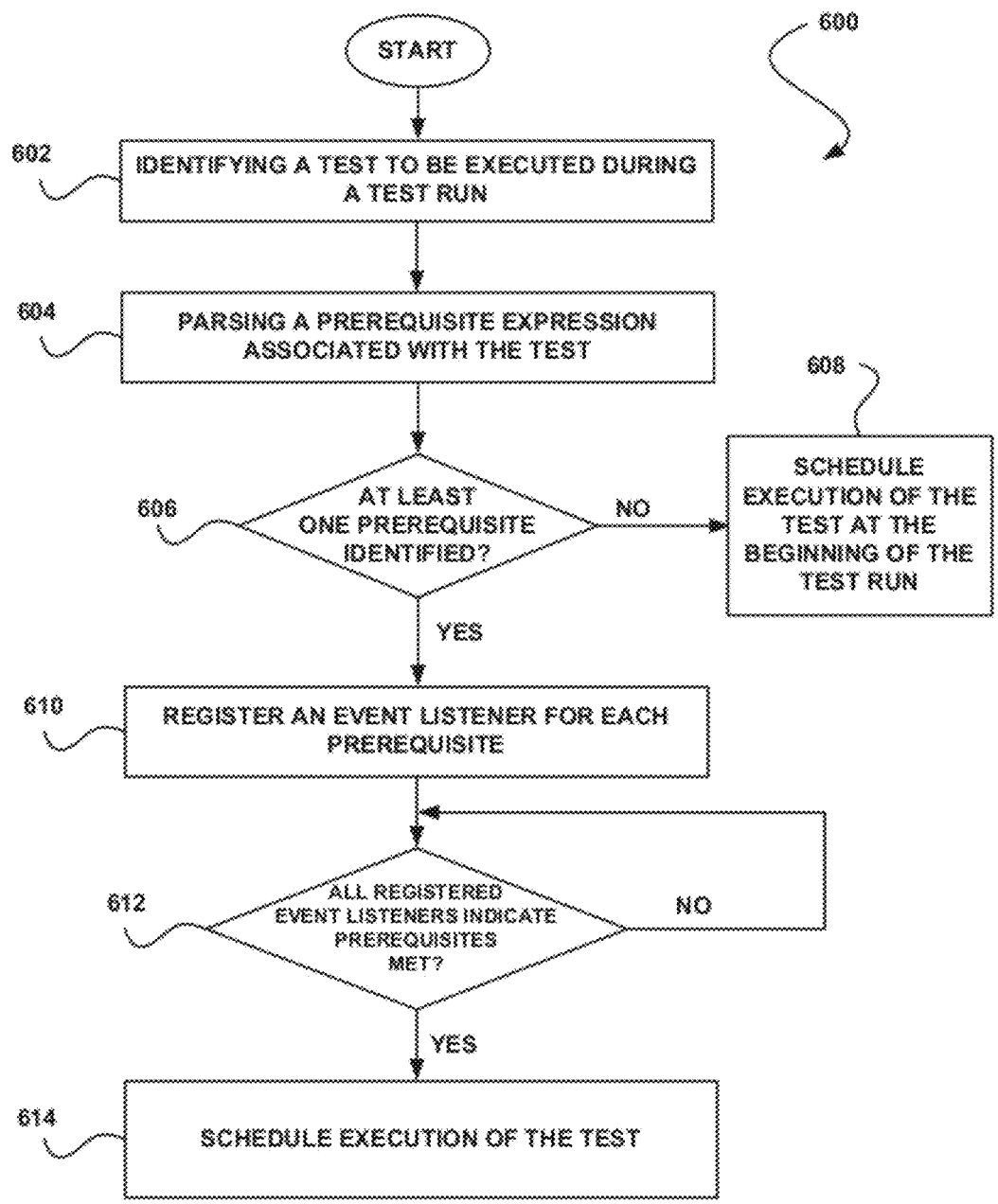
FIG. 6 illustrates a method for scheduling execution of a tests based on an expression associated with the test, in accordance with an embodiment.

FIG. 6 illustrates a method 600 for scheduling execution of a tests based on an expression associated with the test, in accordance with an embodiment. As an option, the present method 600 may be carried out in the context of the functionality of FIGS. 1-5. Of course, however, the method 600 may be carried out in any desired environment. Again, the aforementioned definitions may apply during the present description.

As shown in operation 602, a test to be executed during a test run is identified. In one embodiment, the test may include a test case to be executed with respect to an operation, for testing the operation. For example, the test may include the automatically generated test case described above with respect to FIGS. 1 and/or 2. Optionally, the test may be identified by identifying the test in a database of tests. Further, the test run may include a collection of tests to be executed.

In addition, a prerequisite expression associated with the test is parsed. Note operation 604. The prerequisite expression may include any expression associated with the test (e.g. stored in association with the test, etc.) which indicates prerequisites to execution of the test. Parsing the prerequisite expression may include analyzing the prerequisite expression or otherwise identifying within the prerequisite expression the prerequisites to the execution of the test. As an option, the prerequisite expression may also be validated, prior to be parsed (e.g. such that invalid prerequisite expressions may not necessarily be parsed, a notification may be sent regarding an inability to properly execute the test, etc.).

It is then determined whether at least one prerequisite has been identified, as shown in decision 606. For example, it may be determined whether at least one prerequisite has been parsed from the prerequisite expression associated with the test. If it is determined that no perquisites have been identified, execution of the test is scheduled for a beginning of the test run. Note operation 608. Thus, the test may optionally be run without respect to any prerequisites specific to the test being met.

If it is determined that at least one prerequisite has been identified, an event listener is registered for each identified prerequisite. Note operation 610. The event listener may include any function that is called upon the associated prerequisite being met. For example, as test case states change, listeners may be called. To this end, the registered event listener(s) may be used to determine when all of the identified prerequisites have been met.

Accordingly, as shown in decision 612, it is determined whether all registered event listeners indicate that the prerequisites have been met. If it is determined that all registered event listeners have not indicated that the prerequisites have been met, the method 600 continues to wait for a determination that all registered event listeners have indicated that the prerequisites have been met.

In response to a determination that all registered event listeners have indicated that the prerequisites have been met, execution of the test is scheduled, as shown in operation 614. Execution of the test may be scheduled for any point in time within the test run. Optionally, execution of the test may be scheduled within the test run even in a situation where the test run has already begun (i.e. be executing at least one other test).

With the ability to combine prerequisites using conjunctions, disjunctions, sequences, and combinations of those, a test can state in its prerequisite expression, as an example, that it should run only 15 minutes after another test passes. Another test can say that it should begin execution when another test starts to execute, and another test can depend upon a test failing for it to begin. By allowing tests to form a chain using prerequisite expressions, a feature may be tested in parts, particularly where the feature has parts that take a nontrivial amount of time to execute.

As an option, tests may execute in parallel as much as possible to shorten the execution time of the overall test run. The execution of tests based on prerequisite expressions may allow a high level of control regarding prerequisites and concurrency that it gives test authors. Tests that cannot be run in parallel can have their prerequisites structured to guarantee that they will never be run in parallel, and tests that can safely be run in parallel may be run in parallel as long as they are configured in that manner.

For example, the execution type of any element (e.g. test category, test, etc.) can be set with an execution attribute, which supports serial, parallel, or serial_split. The serial_split execution type may run certain tests in serial while running other tests in parallel. Tests that exist within a parallel category may have their test methods executed in parallel, assuming that their prerequisites are all met. Tests within a parallel category may not necessarily have any mechanisms that serialize their executions other than the overall number of test threads.

Architecture

The test scheduler may be split into two functional modules: test scheduling and specification. The test scheduling module may tie directly into test running code, and the specification module may handle the annotation parsing.

Module View

The prerequisite handlers may all implement a method that sets a prerequisite completion handler, which gets called when the prerequisite's success or failure status is known. The completion handlers may be notified in a depth-first manner, and the root completion handler may be notified when the entire prerequisite's success or failure status is known. Prerequisite completion handlers may be thread-safe as they can be executed from multiple threads.

Test Scheduling

Test scheduling may happen in a class having the following methods:

contains the following methods: scheduling a generic callable to occur after a given delay; adding a test status listener, which will get called once the given test changes its status; removing a test status listener from the given test; returning a snapshot list of the test status listeners on the given test; executing the tests and returning the results; telling the test runner to cancel all pending tests; returning all the tests associated with this runner, which was passed in at construction time;

Runtime View

Each prerequisite handler may have its own strategy for executing prerequisites and notifying completion handlers:

CategoryMutexPrerequisiteHandler: A queue of test cases along with their completion handlers, starting time, and test scheduler is added to when addCompletionHandler( ) is called. If the category has no presently executing test cases, calling addCompletionHandler( ) may add a test case status listener to the given test case and immediately call the prerequisite completion handler for that test case, which will free it for scheduling. Once the test case's status becomes final, the registered listener may check the queue for queued tests. If at least one is queued, it may repeat the cycle by adding a test case status listener to the first queued test and then calling that test's prerequisite completion handler to free it for scheduling. If no more tests are queued, it may put the category to sleep so that the next call to addCompletionHandler( ) can wake up the category. This arrangement may permit only zero or one test at a time within the same category to execute. This prerequisite handler may be invoked only when all other prerequisites for a test case have been satisfied, and that can be accomplished by making it the last prerequisite handler in a SequencePrerequisiteHandler AndPrerequisiteHandler: Completion handlers may be added to all child prerequisite handlers when a caller sets the completion handler in the AndPrerequisiteHandler. These child completion handlers may decrement an AtomicInteger that was initialized to the number of child prerequisites, and when it reaches zero, the completion handler for the AndPrerequisiteHandler may be called. A failure notification may immediately notify the completion handler set in the AndPrerequisiteHandler and prevents further notifications from other child completion handlers from propagating OrPrerequisiteHandler: Completion handlers may be added to all child prerequisite handlers when a caller sets the completion handler in the OrPrerequisiteHandler. These child completion handlers may set an AtomicBoolean, which was initialized to false, to true, indicating that the disjunction is now satisfied. The first satisfaction may notify the completion handler that was set in the OrPrerequisiteHandler. Failure and success notifications from children both decrement an AtomicInteger that was initialized to the number of child prerequisite handlers. When that AtomicInteger reaches zero in a failure handler and no child prerequisite had succeeded, the completion handler may set in the OrPrerequisiteHandler is notified of the prerequisite failure SequencePrerequisiteHandler: A completion handler may be added to the first child prerequisite. When that completion handler is called back successfully, a completion handler is added to the next child prerequisite, and the process repeats. A failure notification may immediately notify the completion handler set in the SequencePrerequisiteHandler and may not add a completion handler to the next child prerequisite, if any TestPrerequisiteHandler: The input completion handler may be registered with the target test in the TestScheduler. Once the test pass or failure status is known to the TestScheduler, the input completion handler may be called from the same thread TimePrerequisiteHandler: A runnable may be added to the list of runtime runnables in the TestScheduler to execute after the input amount of time. When that runnable is executed, the input completion handler may be notified. If the testing gets canceled, the input completion handler may be notified of the failure.

Test Scheduling

The strategy for test scheduling may use the following strategy:

Tests that have a prerequisite may not be scheduled at the beginning of the run. Instead, a test with a prerequisite may be scheduled by its root PrerequisiteCompletionHandler The registration of PrerequisiteCompletionHandlers with tests may take place before the scheduler schedules tests in the executor, which also means that all tests with prerequisites may have their PrerequisiteCompletionHandlers set before testing begins This permits time-based prerequisites to put a "foot in the door" so that the test can be added and executed before the executor runs out of tests to execute.

The ability to look at the test completion statuses from previous runs may be added after the first revision, and that may be implemented as an EventPrerequisiteHandler Emulation of test serialization within a category may be accomplished by adding a shared CategoryMutexPrerequisiteHandler instance for a category to all tests within that category. The CategoryMutexPrerequisiteHandler may be combined with existing prerequisites using a sequence such that the CategoryMutexPrerequisiteHandler may be called only when all other prerequisites for a test case have been satisfied. This may effectively ensure that when a CategoryMutexPrerequisiteHandler becomes satisfied for a test case, that test case can be scheduled for execution immediately to keep the category as active as possible. As another option, a category attribute may tell the scheduler to turn off intra-category test serialization for a category or subcategory CategoryMutexPrerequisiteHandler may ensure that tests continue to be run in parallel when within in the same category.

If a test case fails on its first attempt in the run, its status may be set to RETRYING instead of FAILED or ERROR. If the rerun also fails, then the status may be set to FAILED or ERROR, depending on which one is appropriate.

As a further option, test cases that set shared states can be sequenced using prerequisites such that a test that reads that shared state can be executed only after the test that sets that shared state executes. Prerequisite expressions that include organization (i.e. tenant in a multi-tenant on-demand database system) preference values can let the scheduler set these preferences and run the tests that have the same requirements in parallel, assuming that other prerequisites are also satisfied. An example is a "HTTPS required" configuration switch. The "HTTPS required" tests can state that they require that configuration switch to be enabled before the test is run, and the scheduler can run those tests only when that configuration switch is on. Tests that state that they can run only when "HTTPS required" is off will then be scheduled after (or before) the "HTTPS required" tests are run, thus resulting in fewer state changes in the organization. Tests that will run regardless of this configuration switch can be scheduled independently of the "HTTPS required" state. Because prerequisite expressions can be compound expressions, it's possible for a test to state multiple configuration switch requirements.

Additional Embodiments

A test data interface that includes method for checking, creating, and deleting test data can be implemented by classes that are specified in a prerequisite expression. Before a test is run, the scheduler can ensure that the test data is present and, if it is not, have the implementing class create the test data before the test is run. Test results from prior runs, such as those from other test label runs, can be used in the current test run's prerequisite expression handling.

System Overview

Figure 7:
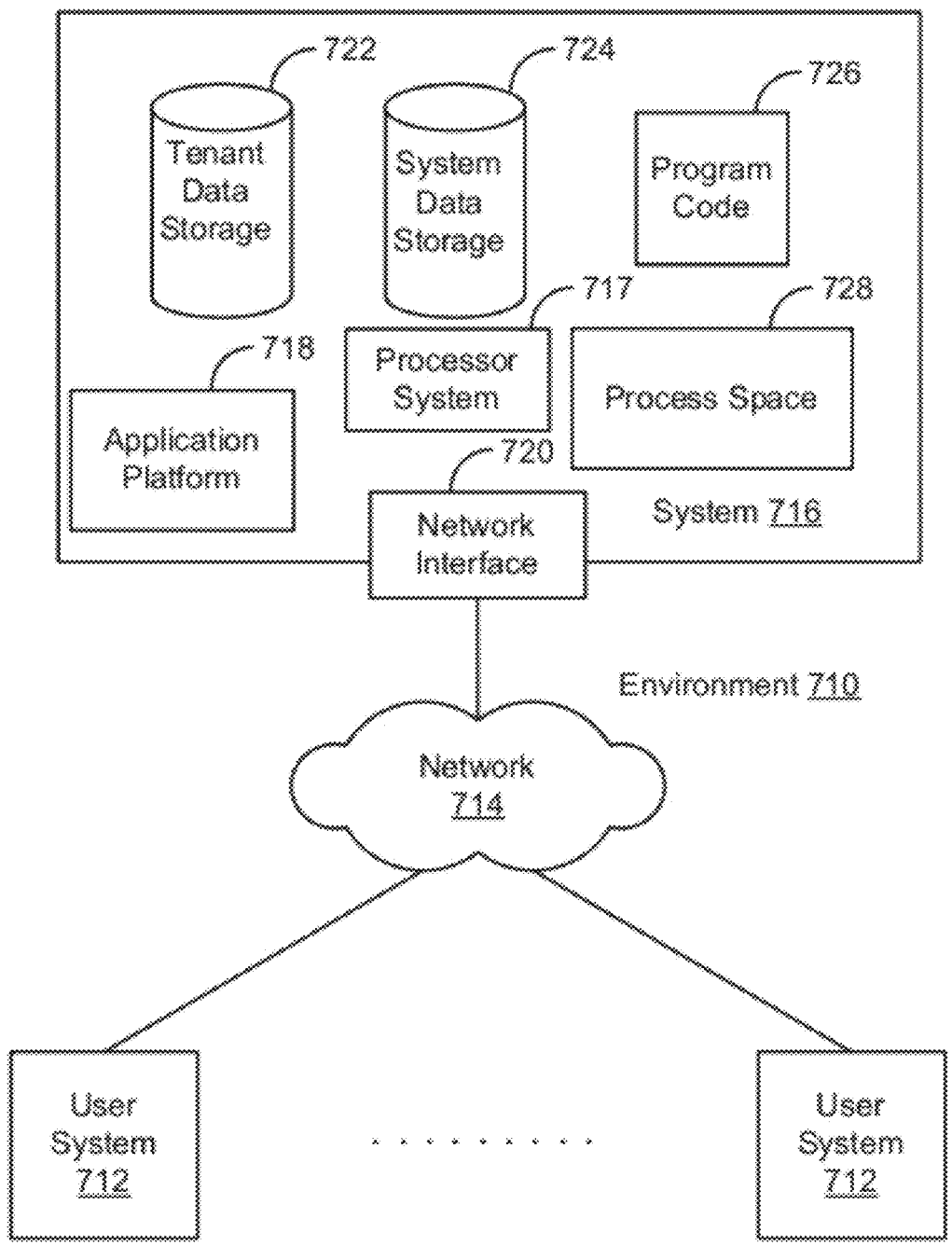
FIG. 7 illustrates a block diagram of an example of an environment wherein an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, hut the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
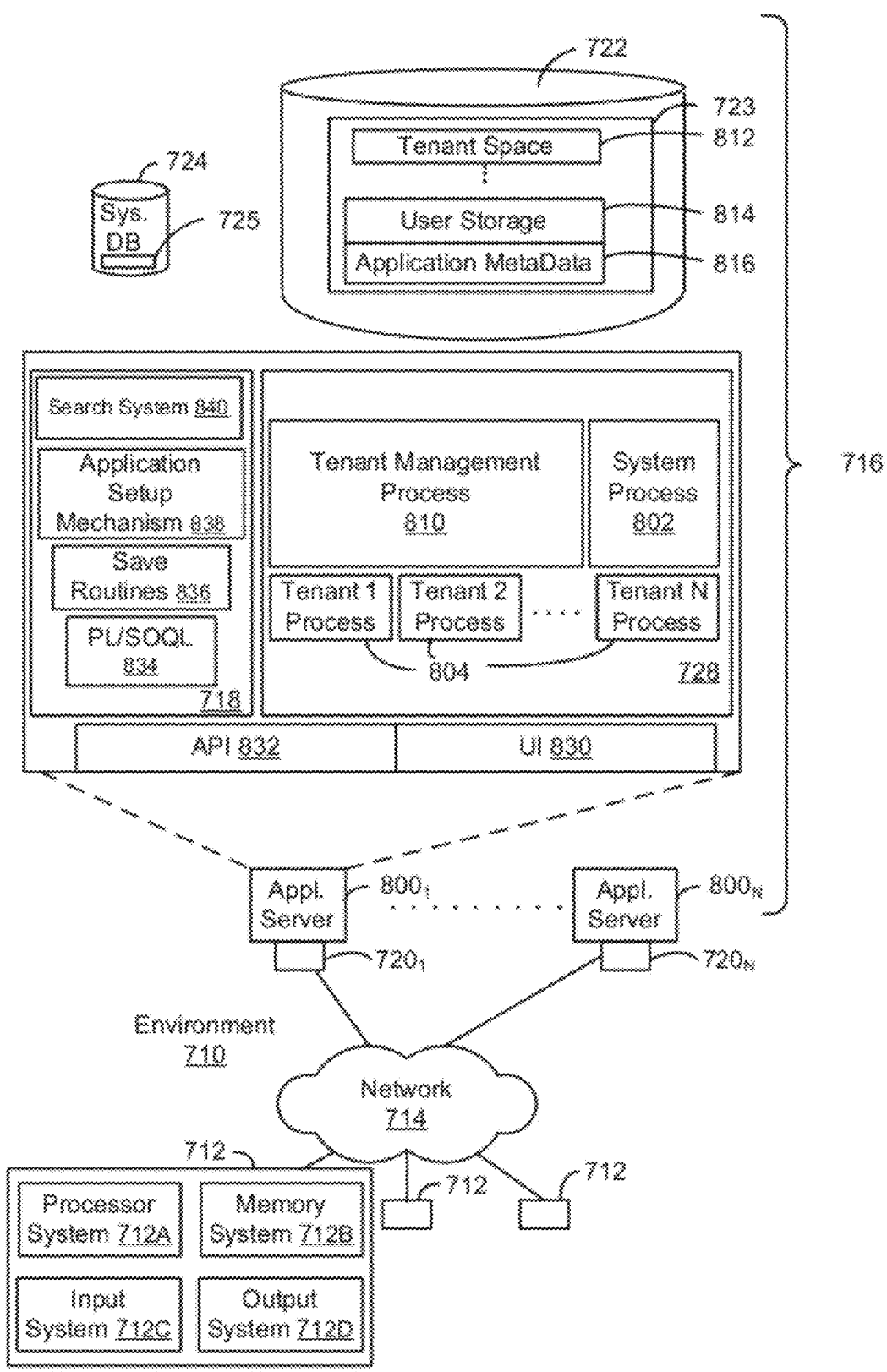
FIG. 8 illustrates a block diagram of an embodiment of elements of FIG. 7 and various possible interconnections between these elements.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User interface (UI) 830, Application Program interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as encompass all such modifications and similar arrangements.

The invention claimed is:

1. A computer program product, comprising a non-transitory computer usable medium having a computer readable program code embodied therein, the computer readable program code adapted to be executed to implement a method for automated test case generation, the method comprising:

identifying a first plurality of mutually exclusive values for at least one input parameter associated with an operation;

identifying a second plurality of mutually exclusive values for at least one output parameter associated with the operation;

selecting one of the first plurality of mutually exclusive values for each of the at least one input parameter and one of the second plurality of mutually exclusive values for the output parameter; and automatically generating a test case for the operation utilizing the selected one of the first plurality of mutually exclusive values and the selected one of the second plurality of mutually exclusive values;

wherein selecting the one of the first plurality of mutually exclusive values and the one of the second plurality of mutually exclusive values includes first selecting the one of the second plurality of mutually exclusive values and second selecting one of the first plurality of mutually exclusive values that is predetermined to be valid with respect to the selected one of the second plurality of mutually exclusive values, and an expression associated with the selected one of the second plurality of mutually exclusive values indicates which of the first plurality of mutually exclusive values is valid with respect to the selected one of the second plurality of mutually exclusive values.

2. The computer program product of claim 1, wherein the operation includes a function of an application.

3. The computer program product of claim 1, wherein the operation includes a function of a graphical user interface (GUI).

4. The computer program product of claim 1, wherein the at least one input parameter includes an input to the operation.

5. The computer program product of claim 1, wherein the at least one output parameter includes an output of the operation.

6. The computer program product of claim 1, wherein the expression is stored in a data repository.

7. The computer program product of claim 1, wherein the test case stores the selected one of the first plurality of mutually exclusive values and the selected one of the second plurality of mutually exclusive values, and is utilized for testing the operation.

8. A method, comprising:

identifying a first plurality of mutually exclusive values for at least one input parameter associated with an operation;

identifying a second plurality of mutually exclusive values for at least one output parameter associated with the operation;

selecting one of the first plurality of mutually exclusive values for each of the at least one input parameter and one of the second plurality of mutually exclusive values for the output parameter; and automatically generating a test case for the operation utilizing the selected one of the first plurality of mutually exclusive values and the selected one of the second plurality of mutually exclusive values, using a processor;

wherein selecting the one of the first plurality of mutually exclusive values and the one of the second plurality of mutually exclusive values includes first selecting the one of the second plurality of mutually exclusive values and second selecting one of the first plurality of mutually exclusive values that is predetermined to be valid with respect to the selected one of the second plurality of mutually exclusive values, and an expression associated with the selected one of the second plurality of mutually exclusive values indicates which of the first plurality of mutually exclusive values is valid with respect to the selected one of the second plurality of mutually exclusive values.

9. An apparatus, comprising:

a processor for:

identifying a first plurality of mutually exclusive values for at least one input parameter associated with an operation;

identifying a second plurality of mutually exclusive values for at least one output parameter associated with the operation;

selecting one of the first plurality of mutually exclusive values for each of the at least one input parameter and one of the second plurality of mutually exclusive values for the output parameter; and automatically generating a test case for the operation utilizing the selected one of the first plurality of mutually exclusive values and the selected one of the second plurality of mutually exclusive values;

wherein selecting the one of the first plurality of mutually exclusive values and the one of the second plurality of mutually exclusive values includes first selecting the one of the second plurality of mutually exclusive values and second selecting one of the first plurality of mutually exclusive values that is predetermined to be valid with respect to the selected one of the second plurality of mutually exclusive values, and an expression associated with the selected one of the second plurality of mutually exclusive values indicates which of the first plurality of mutually exclusive values is valid with respect to the selected one of the second plurality of mutually exclusive values.

* * * * *